Sept. 18, 1928.

H. R. NEWMAN 1,684,879

APPARATUS FOR DISPENSING LUBRICATING OIL

Filed Feb. 15, 1926     5 Sheets-Sheet 4

INVENTOR:
HENRY R. NEWMAN.
By Fred W. Lewis
ATTORNEY.

Sept. 18, 1928.  
H. R. NEWMAN  
1,684,879  
APPARATUS FOR DISPENSING LUBRICATING OIL  
Filed Feb. 15, 1926     5 Sheets-Sheet 5
Fig. 8.
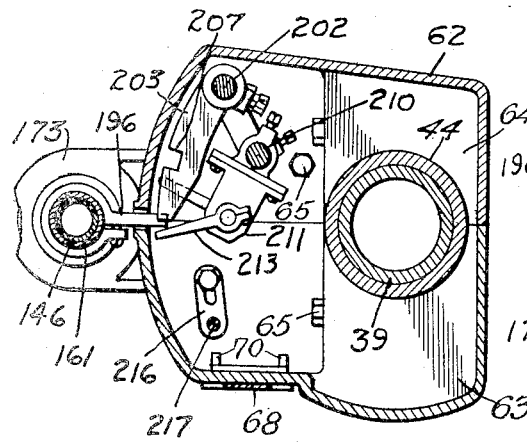
Fig. 7.
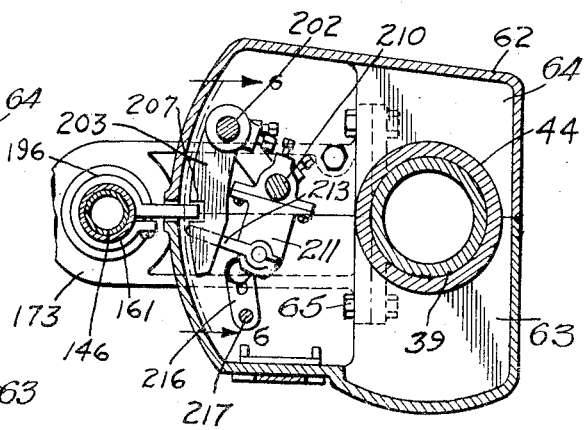
Fig. 9.
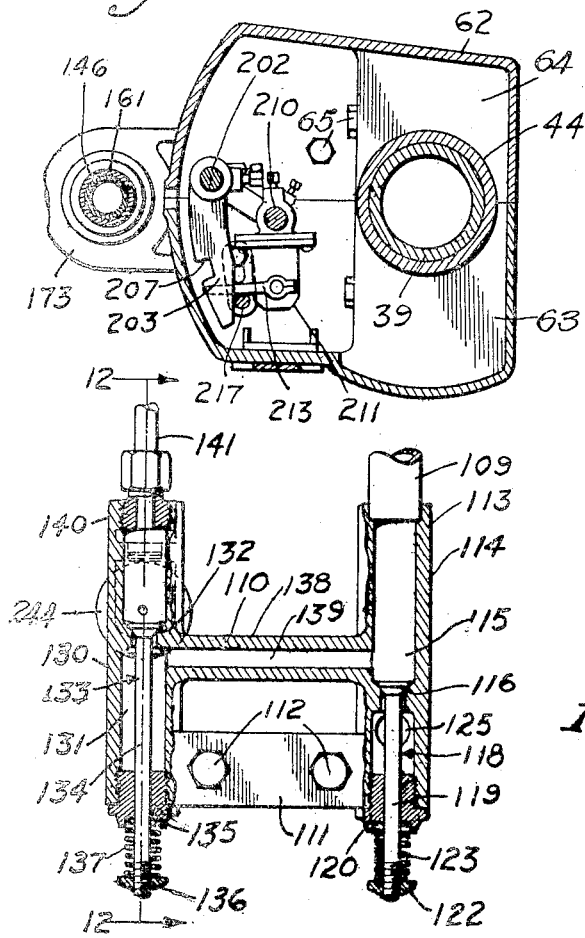
Fig. 6.
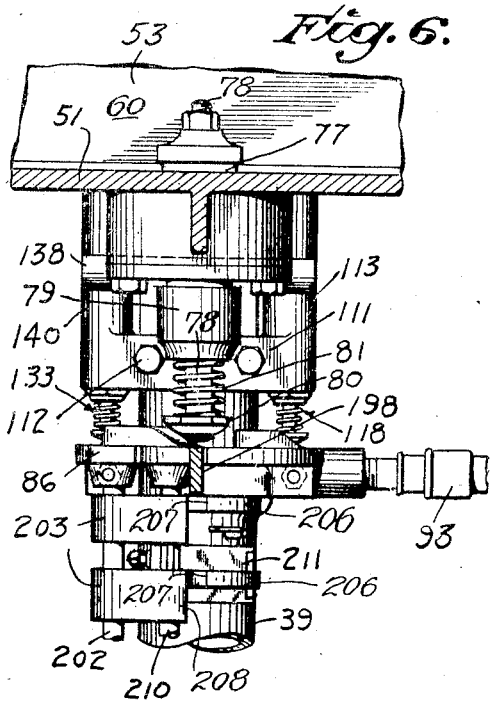
Fig. 11.
INVENTOR:  
HENRY R. NEWMAN.  
BY  
ATTORNEY Patented Sept. 18, 1928.

1,684,879

UNITED STATES PATENT OFFICE.

HENRY R. NEWMAN, OF LOS ANGELES, CALIFORNIA, ASSIGNOR TO BOYLE MANUFACTURING COMPANY, OF LOS ANGELES, CALIFORNIA, A CORPORATION OF CALIFORNIA.

APPARATUS FOR DISPENSING LUBRICATING OIL.

Application filed February 15, 1926. Serial No. 88,248.

My invention relates to an apparatus for dispensing lubricating oil and is designed especially for use in oil stations such as are located on highways for servicing automotive vehicles with gasoline and lubricating oil.

My invention includes a service chamber to which oil to be serviced is supplied. The oil is dispensed through a vertically slidable service tube which is moved downwardly a distance which will allow a predetermined quantity of oil to flow from the service chamber.

It is an object of this invention to provide a dispensing apparatus of this character in which the service chamber cannot be refilled with oil unless the service tube is in zero position.

It is another object of this invention to provide a dispensing apparatus of this character in which the service tube cannot be moved from zero position while the service chamber is being filled with oil.

It is the practice of many oil stations to sell lubricating oil cheaper in larger quantities; for example, one pint of oil at 15 cents would be sold at a price of 25 cents a quart. Because of this, it is desirable to keep an account of the different quantities of oil sold so that a correct cash balance may be had.

It is, therefore, one of the objects of this invention to provide a dispensing apparatus of the character mentioned which will individually register and count the different quantities of oil dispensed thereby.

It is also an object of this invention to provide a dispensing apparatus of the character mentioned in which the oil cannot be dispensed from the service chamber unless the service tube is lowered and pressure is applied to the service chamber.

Another object of my invention is to provide a dispensing apparatus in which the service tube is closed when it is in zero position.

In the operation of my invention the amount of oil in the service chamber above the upper end of the service tube is the quantity of oil to be dispensed. The surface tension of the oil is considerable, and I have discovered that the oil will not drain out of the service chamber to the level of the upper end of the service tube but will build up thereabove so that the oil level is above the upper end of the service tube. The distance between the upper end of the service tube and the oil level varies according to the temperature and for this reason the dispensing of oil would be inaccurate.

It is, accordingly, an important object of this invention to provide a dispensing apparatus having means for overcoming the surface tension of the oil and cause it to drain from the service chamber to the same level as the upper end of the service tube regardless of the temperature.

It is a still further object of my invention to provide a dispensing apparatus in which lubricating oil may be dispensed directly to the crank case of an automotive vehicle.

Other objects and the salient advantages of this invention will be evinced forthwith.

Fig. 6 is a fragmentary section taken on the line 6—6 of Fig. 7.

Fig. 7 is a section taken on the line 7—7 of Fig. 1, showing the parts thereof in neutral position.

Fig. 8 is a view similar to Fig. 7, but showing the parts in servicing or dispensing position.

Fig. 9 is a section similar to Fig. 7, but showing the parts in refilling position.

Fig. 10 is a perspective view of a service tube lock member of this invention.

Fig. 11 is a section taken on the line 11—11 of Fig. 4.

Fig. 12 is a section taken on the line 12—12 of Fig. 11.

Fig. 13 is a perspective view of a shell of the invention.

Fig. 14 is a section taken on the line 14—14 of Fig. 13.

Fig. 15 is an enlarged fragmentary section showing the means of this invention for overcoming the surface tension of the oil.

Figure 3:
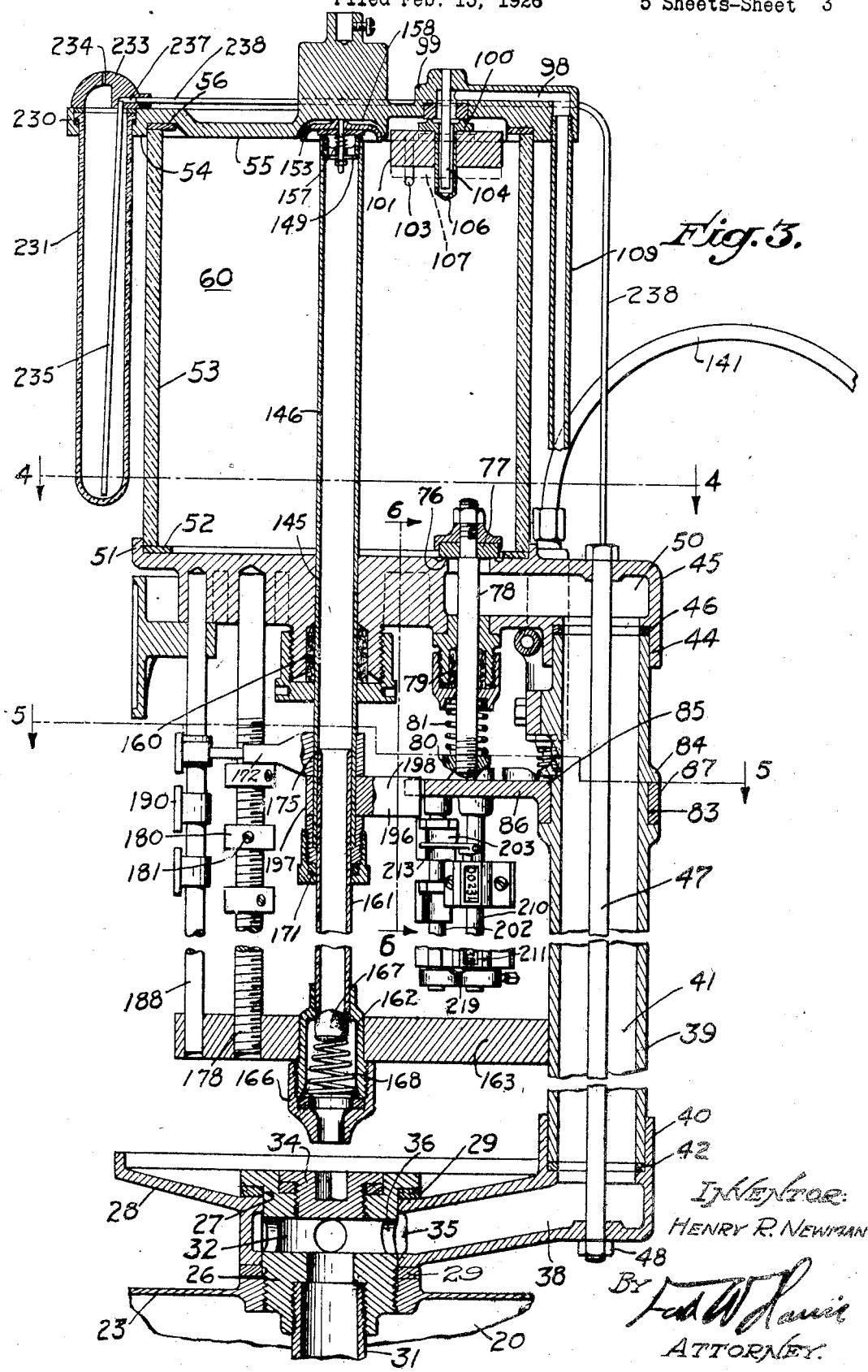
Fig. 3 is an enlarged fragmentary contracted section taken on the line 3—3 of Fig. 2 in the direction of the indicating arrows.

Referring in detail to the drawings, the form of my invention consists of a reservoir tank 20 which is air-tight so that it may retain an air pressure therein. The air pressure is supplied thereto by means of an air pressure pipe 21 having a gauge 22, which connects to an upper end 23 of the reservoir tank 20. Referring to Fig. 3, the end 23 of the tank 20 is provided with a threaded mouth into which a bushing 26 is secured. The bushing 26 extends through an opening 27 of a pan casting 28 and secures the pan casting 28 in place between gaskets 29. A take-off tube 31 communicating with an opening 32 of the bushing 26 extends downwardly therefrom to a point adjacent to the bottom of the reservoir tank 20. The tank 20 may be filled with oil through the take-off tube 31 and the opening 32 of the bushing 26 by unscrewing a plug 34 from the bushing, this providing access to the opening 32 so that the oil may be poured into the reservoir tank 20. The pan casting 28 has an annular channel 35 which connects to the opening 32 through ports 36 formed in the bushing 26. The channel 35 connects with an opening 38 formed along one side of the pan casting 28, as illustrated best in Fig. 3. The lower end of a vertical column 39 extends into a mouth 40 of the pan casting 28 so that a passage 41 thereof is in communication with the passage 38 of the pan casting 28. The lower end of the vertical column 39 engages a washer 42. The upper end of the vertical column 39 extends into a mouth 44 of a base member 45 and engages a washer 46 therein. The pan casting 28, the column 39, and the base member 45 are secured together by a vertical bolt 47 which extends through the passage 41 and has a nut 48 screwed on the lower end thereof. The base member has a passage 50 formed therein which communicates with the passage 41 of the column 39 and connects to the upper face of the base member 45, as shown.

The base member 45 is provided with an annular and upwardly projecting rim 51 inside of which there is placed a gasket 52. Extending inside the rim 51 and engaging the gasket 52 is the lower end of a glass cylinder 53. The upper end of the glass cylinder 53 extends inside an annular and downwardly projecting rim 54 of a cover 55, the upper end of the glass cylinder 53 engaging a gasket 56. The base member 45 and the cover 55 are secured together by bolts 58, as illustrated best in Fig. 1, and in Fig. 4. The base member 45, the glass cylinder 53 and the cover 55 cooperate to provide a service chamber 60.

Figure 2:
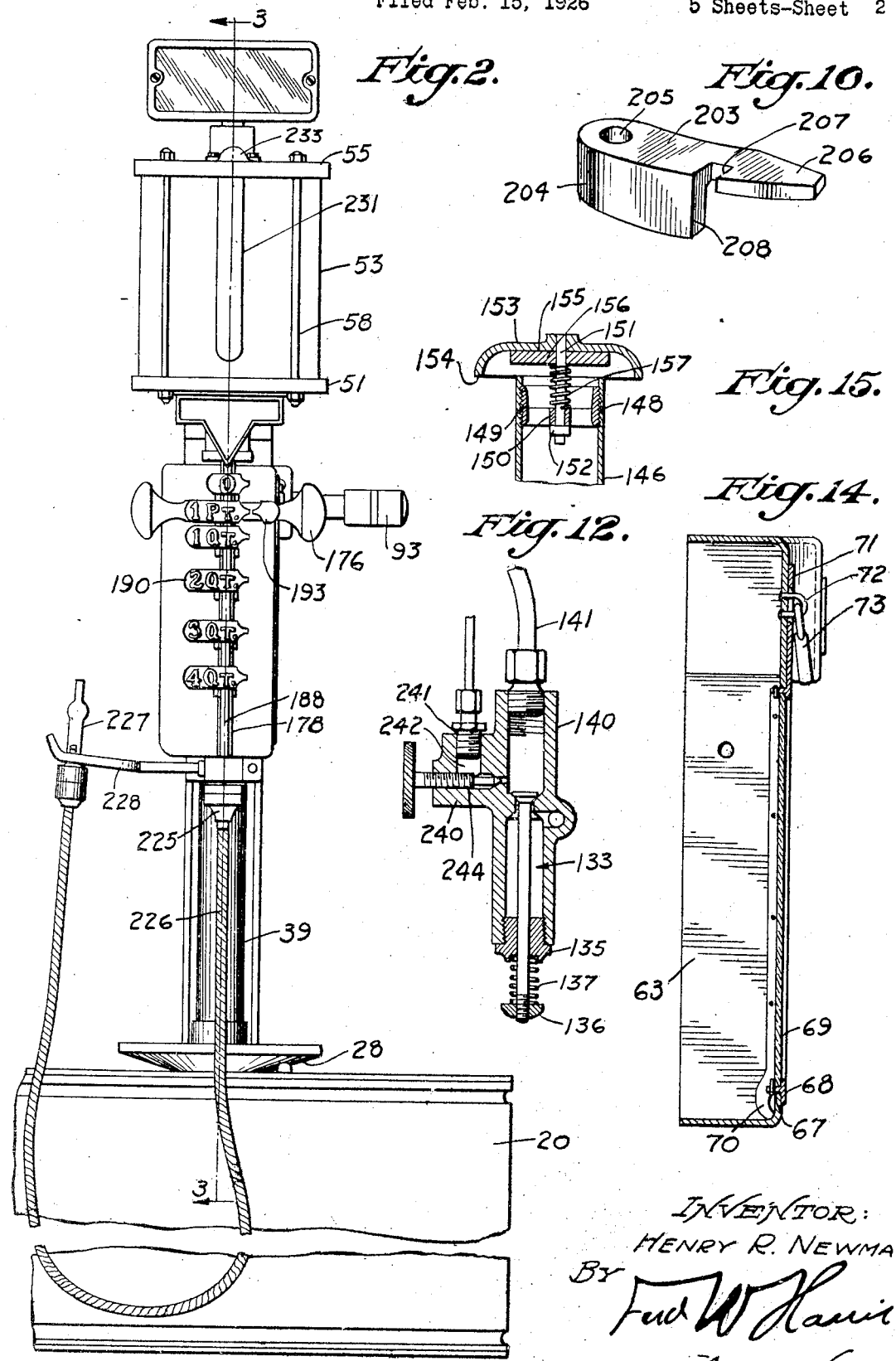
Fig. 2 is a front elevation of Fig. 1 taken as indicated by the arrow 2 of Fig. 1.
Figure 4:
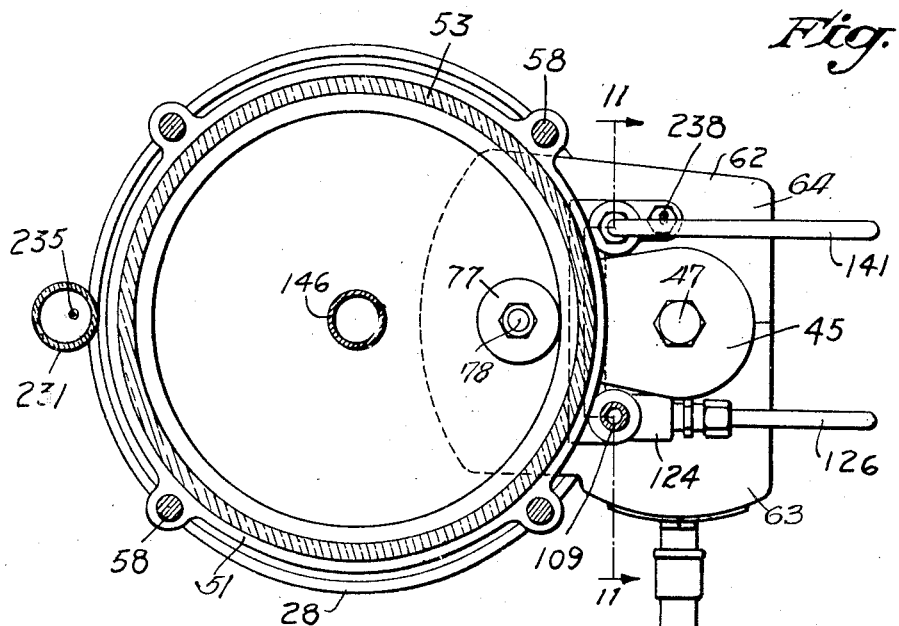
Fig. 4 is a section taken through the service chamber of my invention as indicated by the line 4—4 of Fig. 3, and taken in the direction of the indicating arrows.
Figure 5:
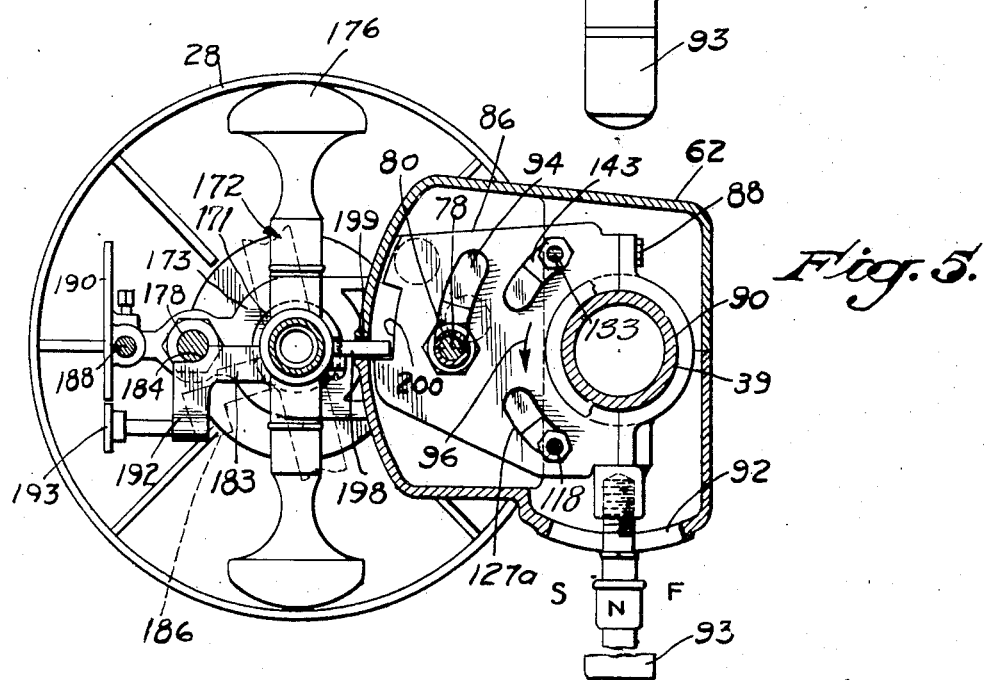
Fig. 5 is a section taken on the line 5—5 of Fig. 3.

Secured to the column 39 directly below the base member 45 is a shell 62 which is shown in place in Figs. 2, 4 and 5 and shown in detail in Figs. 13 and 14. The shell 62 consists of cooperating shell members 63 and 64 which are secured in place by bolts 65. The shell members 63 and 64 have laterally projecting portions 66 which surround a portion of the column 39 directly below the base member 45. The bolts 65, which secure the shell member 64 in place, are tightened before the shell member 63 is installed in place. The bolts 65, which secure the shell member 63 in place, must be installed and tightened after the shell member 63 is in place and through an opening 67 formed therein. This opening 67 is provided with an insert frame 68 having a window 69. The insert frame 68 has fingers 70 extending downwardly from the lower end thereof which are adapted to engage the inner face of the side of the shell member 63 when the insert frame 68 is in place. A lug 71 extends from the upper end of the insert frame 68 having an opening through which a staple 72 extends. A lock 73 has a hasp which is provided for extension through the loop of the staple 72 for locking the upper end of the insert frame 68 in place. The bolts 65 are all tightened in place before the insert frame 68 is installed in place. The opening closed by the window 69 is too small to provide access to the bolts 65 even though it were broken.

The passage 50 in the base chamber, since it communicates with the upper face of the base member 45, connects to the service chamber 60. Surrounding the upper end of the opening 50 is a seat 76 which may be engaged by an oil inlet valve 77. A stem 78 of the valve 77 extends downwardly through a stuffing box 79 and into the upper part of the shell 62. The lower end of the stem 78 is provided with a head 80 and compressed between the head 80 and the stuffing box 79 is a compression spring 81 which resiliently causes the head of the oil inlet valve 77 to pressurally engage the seat 76.

That portion of the column 39 enshrouded by the lateral portion 66 of the shell 62 is provided with a bearing 83 which is positioned between annular flanges 84. Placed inside the shell 62 and journaled on the bearing 83 is an operating member 85. The operating member 85 consists of a cam plate 86 and a bracket portion 87 which is secured thereto by cap screws 88. The cam plate 86 and the bracket 87 cooperate to provide a journal face 90 which engages the bearing 83, thus rendering the operating member 85 swingable on a vertical axis. Extending from the operating member 85 through a horizontally elongated opening 92 formed in the shell member 63 of the shell 62 is a handle 93 by means of which the operating member 85 may be swung. A cam 94 is formed on the upper face of the cam plate 86 in such a position that the head 80 of the oil inlet valve 77 will be engaged and raised against the action of the compression spring 81 when the operating member 85 is moved from normal position, as shown in Fig. 5, in a direction indicated by the arrow 96 and into what is denominated a refilling position, which position corresponds to the positions of the parts shown in Fig. 9. When the operating member 85 is in refilling position, the oil inlet valve 77 is disengaged from the seat 76 and the passage connecting between the reservoir tank 20 and the service chamber 60 is unobstructed. Therefore, oil which is under pressure in the tank 20 may flow into the service chamber 60.

The cover 55 is provided with an opening 98 which connects with the service chamber 60. The inner end of the opening 98 is surrounded by a seat 99. The seat 99 is adapted to be engaged by a float valve 100 which is carried by a float 101, the lower position of which float 101 is determined by an arm 103 which extends from the cover 55. Extending downwardly from the cover 55 is a rod 104 which projects into a socket 106 for centralizing the float valve 100. When the service chamber 60 is not full, the float and float valve occupy positions indicated by dotted lines 107, but when the service chamber 60 is full these parts occupy positions shown by full lines in Fig. 3 and thus the opening 98 is closed. Screwed to the cover 55 in communication with the outer end of the opening 98 is an air line 109 which connects to a valve casting 110, the valve casting 110 being shown in detail in Figs. 11 and 12. This casting 110 provides a horizontal bar 111 which rests inside the housing 62 and which is secured to the column 39 by cap screws 112. The air line 109 connects to a vertical leg 114 of the valve casting 110 in communication with a passage 115 thereof. Near the central part of the passage 115 there is provided a valve seat 116 which is adapted to be closed by a drain valve 118. A stem 119 of the drain valve extends downwardly and outwardly from the vertical leg 114 through a plug 120 which is provided with a nut 122 at the lower end thereof between which nut 122 and the plug 120 there is a compression spring 123 which resiliently seats the valve 118. Connected to the vertical leg 114 at a point below the seat 116 is a lateral projection 124 having an opening 125 formed therein. Connected to the projection 124 is a vertical drain tube 126, the lower end of which is connected to a horizontal drain tube 127 by means of a T fitting 128. The horizontal drain tube 127 connects, as shown at 129 in Fig. 1, to the pan casting 28 by means of which any oil spilled in the pan casting may be drained therefrom. This horizontal drain tube 127 is extended to a suitable drain sump.

The nut 122 of the drain valve 118 occupies a position directly above the cam plate 86. Formed on the cam plate 86 is a cam 127ª which is adapted to engage the nut 122 when the operating member 85 is moved into refilling position. The engagement of the nut 122 by the cam 127ª lifts the drain valve 118 from its seat 116 and thus provides an open vent line for the chamber 60. The valve casting 110 also has a vertical leg 130 in which an opening 131 is provided. The opening 131 is formed to provide a seat 132 which is adapted to be engaged by an air pressure valve 133. A stem 134 of the air pressure valve 133 extends downwardly from the leg 130 through a plug 135 and has a nut 136 secured to the lower extending end thereof. Compressed between the nut 136 and the plug 135 is a compression spring 137 which causes the air pressure valve 133 to resiliently engage the seat 131. A horizontal leg 138 of the valve casting 110 connects between the vertical legs 114 and 130 and has an opening 139 formed therein which connects to the opening 115 of the leg 114 directly above the valve seat 116. The upper end of the leg 132 has an air supply line 141 connected thereto, which air supply line 141 is connected to the upper part of the supply tank 20 through the upper end 23 thereof.

The nut 136 occupies a position directly above the cam plate 86. Formed on the cam plate 86 is a cam 143 which is adapted to engage the nut 136 when the operating member 85 is moved from normal position, as shown in Fig. 5, in a direction opposite to that indicated by the arrow 96. Such a position of the operating member 85 is denominated a servicing or dispensing position and corresponds to the positions of the parts as shown in Fig. 8. When the operating member 85 is in dispensing position, the air pressure valve 133 is lifted from its seat 132 against the action of the compression spring 137 and the air supply line 141 is connected to the lower part of the opening 131, and consequently is connected to the air line 109 by means of the openings 139 and 115.

Extending into the service chamber 60 through an opening 145 of the base member 45 is a vertically slidable service tube 146. The upper end of the service tube 146 is internally threaded at 148, as clearly illustrated in Fig. 15, to receive a spider 149.

Extending through a hub 150 of the spider 149 is a stem 151 on the lower end of which a collar 152 is attached. Attached to the upper end of the stem 151 is a member 153 having a downwardly extending annular lip 154 which surrounds the upper end of the service tube 146. Placed directly below a lateral portion 155 of the member 153 is a valve 156. A spring 157 is compressed between the upper face of the hub 150 and the valve 156 for resiliently holding the parts in the position shown in Fig. 15. When in this position the lower edge of the lip 154 is in substantially the same plane as the upper end of the service tube 146. In Fig. 3, the service tube 146 is shown in zero position. At this time the member 153 rests in a cavity 158 formed in the lower face of the cover 55 and is forced downwardly from the position shown in Fig. 15 so that the valve 156 engages and closes the upper end of the service tube 146. The service tube 146, as mentioned before, extends from the chamber 60 through the opening 145, and it also extends through a stuffing box 160. Extending upwardly into the lower end of the service tube 146 is a stationary tube 161. The lower end of the stationary tube 161 is provided with a housing 162 which is supported by a supporting plate 163. The supporting plate 163 is attached to the column 39 by cap screws 164, as shown best in Fig. 1. The lower part of the housing 162 is threaded and a nozzle 166 is screwed thereonto. The nozzle 166 and the housing 162 enclose a ball valve 167 which is caused to engage and close the lower end of the stationary tube 161 by a helical spring 168. The lower end of the slidable service tube 146 is provided with a stuffing box 171 which surrounds the stationary tube 161 and prevents leakage thereat.

Secured to the lower end of the service tube 146 a short distance above the stuffing box 171 is a selector 172. The selector 172 consists of a casting 173 having an opening 175 through which the service tube 146 extends, this casting 173 being rigidly secured to the service tube 146. Secured to the casting 173 and extending outwardly from the opposite sides thereof are knobs 176 by means of which selector 172 may be manually engaged and operated. Extending vertically between the base member 45 and the supporting plate 163 and secured to these parts is a shaft 178. This shaft 178 is positioned directly in front of the service tube 146 and the stationary tube 161. The shaft 178 is threaded as indicated and quantity-stops in the form of nuts 180 are screwed threreonto. These quantity-stops 180 may be adjusted into a proper position for controlling the different dispensing positions of the service tube 146 which will be explained later. These quantity-stops 180 may be locked in place by set screws 181. The casting 173 is provided with a forwardly extending arm 183 which has an arcuated face 184 which may engage the shaft 178. The lower face of the forwardly extending arm 183, when the selector 172 is in the position shown in full lines in Fig. 5, may engage the upper faces of any of the quantity-stops 180. It will be seen then that the quantity-stops 180 determine the vertical position of the selector 172 and consequently the vertical position of the service tube 146. When the service tube 146 is to be moved from zero position into different dispensing positions, the selector 172 must be moved into the position indicated by dotted lines 186 in Fig. 5, so that the arm 183 will move out of engagement with any of the quantity-stops 180. When the selector is in the position indicated by dotted lines 186 in Fig. 5, it may be moved vertically to a desired position. A rod 188 extends vertically between the base member 45 and the supporting plate 163 directly in front of the shaft 178. This rod 188, as illustrated best in Figs. 1, 2 and 3, carries indicia 190 which indicate the amount of oil being dispensed from the service chamber 60. The arm 183 has a lateral portion 192 which supports a pointer 193. This pointer 193 extends forwardly from the lateral portion 192 of the arm 183 into the same plane as indicated at 190. When the selector is in zero position, the pointer 193 rests adjacent to the zero indicia and when the selector is in position so that one pint is being dispensed from the service chamber 60 the pointer 193 rests adjacent to the one pint indicia as illustrated in Fig. 2.

Supported at the lower end of the service tube 146 between the stuffing box 171 and the casting 173 of the selector 172 is an engager 196. The engager 196 has a hub portion 197 which surrounds the service tube 146 and is rotatable thereon. Extending from the hub 197 is a tongue 198. As illustrated clearly in Fig. 5, the tongue 198 extends through a vertical slot 199 in the shell 62. The inner end of the tongue 198 projects so that it will extend into a notch 200 of the cam plate 86 when the selector is in zero position. Extending downwardly from the cam plate 86 is a rod 202 to which service tube lock members 203 are secured. These service tube lock members 203 are constructed as typically illustrated in Fig. 10. A head portion 204 of each member 203 is provided with a vertically extending opening 205. Projected from the upper part of each head portion 204 is an arm 206. At a point where the arm 206 joins one of the heads 203 there is a vertical slot 207, one side wall of which is in alignment with a vertical shoulder 208 which is formed on each head 204. The service tube lock members 203 are secured on the rod 202 so that the slots 207 are in alignment and align with the tongue 198 when the parts are in the positions shown in Fig. 5 which is a neutral position of all the parts of the apparatus. Also, the service tube lock members 203 are spaced on the rod 202 so that the tongue 198 may rest in a space between adjacent arms 206 when the selector is in any of its dispensing positions. If the selector is not in a proper dispensing position, the tongue 198 will not occupy a position between adjacent arms 206, but either the upper or lower edge thereof will extend into one of the slots 207 and prevent an operation of the apparatus. Extending downwardly from the cam plate 86 adjacent to the rod 202 is a bar 210. Secured to the bar 210 is a plurality of counters of meters 211, there being one counter for each dispensing position of the selector 172. As shown best in Figs. 7, 8 and 9, the counters have actuating arms 213 which extend horizontally toward the front of the apparatus; that is, in a direction toward the selector 172. Each of the arms 213 is positioned centrally in a horizontal plane with respect to one of the spaces between adjacent arms of the service tube lock members. When the operating member 85 is moved into servicing or dispensing position, the parts are moved into the positions shown in Fig. 8. The actuating arm 213 situated in the space occupied by the tongue 198 will be engaged and swung from normal position, as shown in full lines in Fig. 7, into operated position, as shown in full lines in Fig. 8. Extending vertically inside the shell 62 and supported by brackets 216 which are secured to the shell 62 is a return rod 217. The return rod is so positioned that it will engage any of the actuating arms 213 and return them to normal position when the operating member 85 is moved into refilling position such as shown in Fig. 9. This returning of the operating actuated arm completes a full operation of the meter and causes it to register once. The lower ends of the rod 202 and the bar 210 are secured together by a bearing bracket 219 for the purpose of supplying these parts with rigidity.

The operation of the parts of the invention just described is substantially as follows:

In the first place, it is necessary to fill the reservoir tank 20 with oil. This is accomplished by removing the plug 34 and introducing oil through the bushing 26 and the take-off tube 31. After the tank 20 has been filled, the plug 34 may be replaced and a pressure by means of compressed air is exerted on the oil within the tank 20, the compressed air being supplied to the tank 20 through the pipe 21. This pressure on the oil causes it to rise through the take-off tube 31, the bushing 26, the pan casting 28, the column 39 and into the passage 50 of the base member 45. The parts of the apparatus which control the refilling of the service chamber 60 and the servicing of the oil therefrom are in positions shown in Figs. 3, 5, 6 and 7. The float valve 100 and the float 101, since the service chamber 60 is empty, occupy the position indicated by dotted lines 107 of Fig. 3.

The first operation is to fill the service chamber 60 with oil. This is accomplished by moving the handle 93 into a position indicated by the letter F in Fig. 5 in order to move the parts of the apparatus into refilling position as shown in Fig. 9. It is necessary for the selector and the service tube to be in zero position at this time so that the tongue 198 will extend into the groove 200 of the cam plate 86. If the selector is not in zero position the shoulder 208 of one of the service tube lock members will engage the tongue 198 and prevent a moving of the operating member 85 into refilling position. When the operating member is moved into refilling position the oil inlet valve 78 and the drain valve 118 are opened, as previously described. The opening of the oil inlet valve 78 permits the oil to pass into the lower part of the service chamber 60, the service chamber 60 being gradually filled. Air which is present in the service chamber 60 is free to flow therefrom through the passage 98, the air line 109, the valve casting 110 and the drain tubes 126 and 127, since the drain valve 118 is open at this time. As the level of the oil reaches the upper end of the service tank 60, the float 101 is gradually lifted and the float valve 100 is brought into engagement with the seat 99. When the service chamber 60 is completely filled, the opening 98 in the cover 55 is completely closed and the flow of oil will cease. At this time the handle 93 may be returned to normal position, as shown in Fig. 5, and the drain valve 118 and the oil inlet valve 78 will be closed.

As previously mentioned, the valve 156 closes the upper end of the service tube 146 when it is in zero position; therefore, there can be no flow of oil through the service tube 146 even though the oil inlet valve 78 is not closed immediately after the service chamber 60 becomes full.

The next operation is to dispense the oil from the service chamber 60. This is accomplished in the following manner. The selector 172 must be moved from zero position into a position to permit the dispensing of the desired quantity of oil. For example, suppose it is desired to dispense one pint of oil. The selector must be moved from zero position, as shown in Fig. 3, into a dispensing position as indicated in Fig. 2. To move the selector from zero position into this position shown in Fig. 2, it is necessary to rotate the selector 172 into the position indicated by dotted lines 186 of Fig. 5 so that the arm 183 will be disengaged from the upper quantity-stop 180. The selector may then be moved downwardly past the upper quantity-stop 180 until the pointer 193 occupies a position adjacent to the one pint indicia 190, as shown in Fig. 2. At this time the selector 172 may be swung from a position equivalent to the dotted line position in Fig. 5 into a position equivalent to full line position therein so that the arm 183 will engage the quantity-stop which determines the one pint dispensing position of the selector. It is understood, of course, that the service tube 146 is moved downwardly a corresponding distance. When the service tube is moved from zero position, the structure at the upper end thereof moves into the position shown in Fig. 15 in order to open the upper end of the service tube 146. However, no oil can flow from the service chamber 160 because of the ball valve 167 which closes the lower end of the stationary tube 161, the static head of the oil not being sufficient to unseat the ball valve 167. After the selector and service tube have been moved into the desired servicing or dispensing position, the handle 93 is moved into servicing position such as indicated by the letter S in Fig. 5 and so that the parts associated therewith occupy positions as shown in Fig. 8.

It should be noted that the operating member 85 cannot be moved into a servicing position when the selector 172 is in zero position because one edge of the notch 200 will engage the tongue 198 if there is an attempt to move the operating member 85 in the direction reverse to that indicated by the arrow 96 while the selector is in zero position. However, when the selector is moved into a proper dispensing position the tongue 198 rests between the arms of adjacent service tube lock members and there will be no interference to the moving of the parts of the apparatus into servicing position. When the operating member 85 moves into dispensing position, the cam 143 engages the nut 136 of the air pressure valve 133 and supplies air under pressure to the upper end of the service tank 60 through the opening 98 in the cover 55. This pressure on the top of the oil causes it to flow around the downwardly extending lip 154 of the member 153 and to flow through the service tube 146 and the stationary tube 161. The pressure of the air is sufficient to unseat the ball valve 167; therefore, the lower end of the stationary tube 161 is opened and oil will flow through the nozzle 166, there being placed a suitable container therebelow to receive the oil. When the service tube 146 is removed from zero position, the spring 157 unseats the valve 156 so as to provide a space through which the oil in the service chamber 60 may pass. As pointed out as one of the objects of this invention, the member 153 is a very important part of the invention. As previously stated, the surface tension of the oil is so great that an accurate servicing of the oil cannot be obtained if the upper end of the service tube 146 is left open. The member 153 is found to be effective in causing the oil to flow from the service chamber 60, when the service tube 146 is in a dispensing position, to a level of the upper end of the service tube. The oil is forced out and occupies the same level as the upper end of the service tube regardless of the temperature or viscosity of the oil. The member 153 causes the oil to flow into the upper end of the tube 146 from below and it is thought that this is the reason that a surface tension is overcome. When the operating member 85 is moved into dispensing position the tongue 198, as illustrated in Fig. 8, engages one of the actuating arms 213 of a counter 211, moving it into a position shown in Fig. 8. When the pint of lubricating oil has been dispensed, the operating member 85 is returned to neutral position so that the slots 207 of the members 203 align with the tongue 198 so that the selector and service tube may be returned to zero position. The selector cannot be moved while the operating member 85 is in dispensing position, since there is an arm 206 extending on each side of the tongue 198. When the operating member 85 is returned to neutral position the actuating arm 213 which has been moved by the tongue 198 is brought into engagement with the return bar 117 and returned to normal position. This completes the stroke of the actuating member 213 and causes the counter associated therewith to register. When the service tube 146 has been returned to zero position, the service chamber 60 may be refilled as previously explained.

Figure 1:
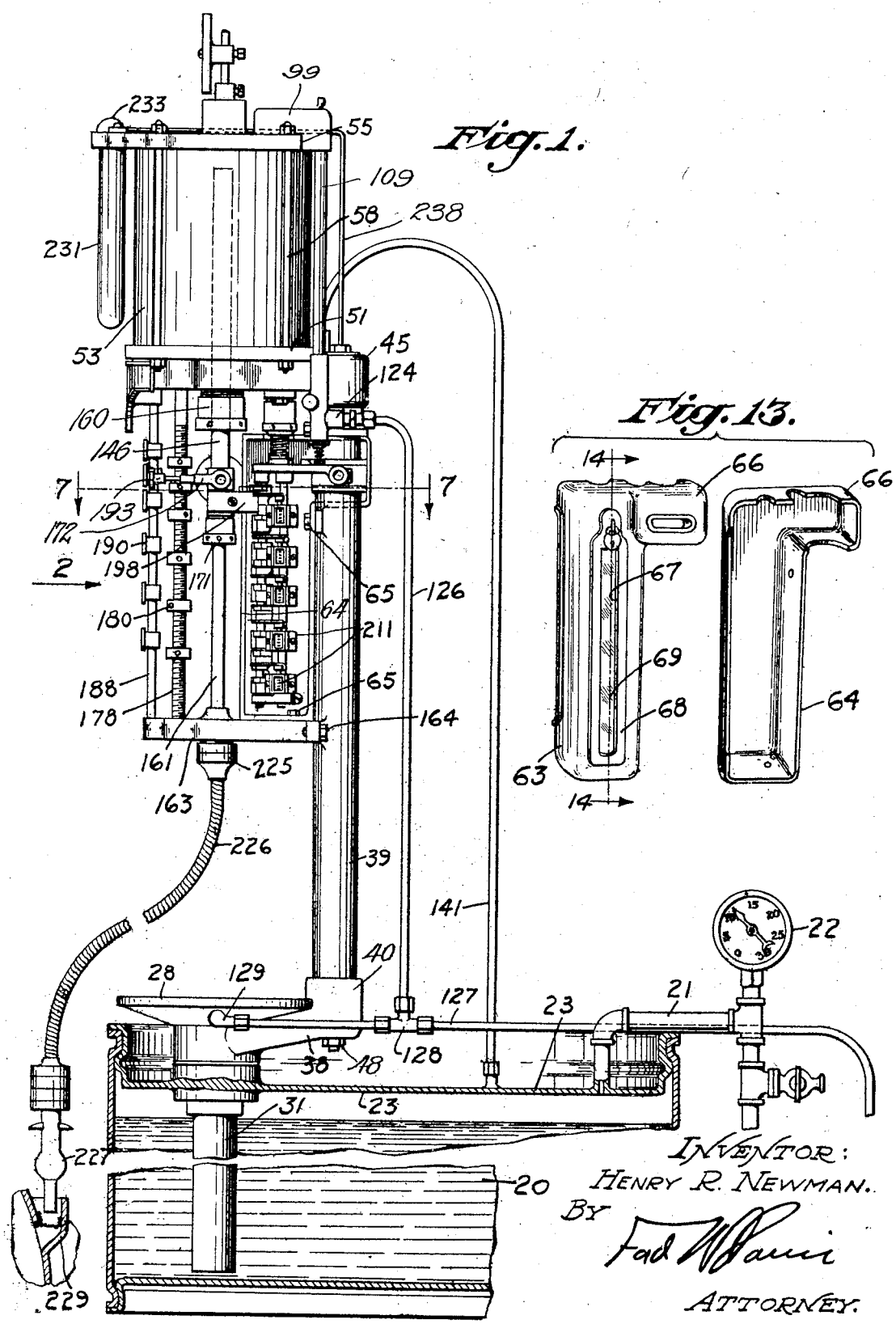
Fig. 1 is a side elevation of an oil dispensing apparatus of my invention, this view being partially sectioned and contracted and having certain parts thereof eliminated in order to reveal the important features thereof.

Referring to Fig. 1, in place of dispensing the oil from the service chamber 60 into a container I may dispense it directly to the crank case of the automotive vehicle. This is accomplished by replacing the nozzle 166 with a nozzle 225 having a flexible hose 226 connected therewith. The flexible hose 226 may have a nozzle 227 which may be supported by a forked member 228 extending from the side of the supporting plate 163. When it is desired to service oil, the nozzle 227 is extended into the breather of the automotive vehicle, as illustrated at 229 in Fig. 1. The dispensing apparatus may then be operated to dispense the desired quantity of lubricating oil directly to the automotive vehicle. Referring particularly to Figs. 1, 2 and 3, in the forward part of the cover 55 of the service chamber 60 is formed a ring 230 which is adapted to support a display tube 231. The upper end of the display tube 231 which is made of glass is closed by a cover 233 having an opening 234 formed therein. Extending downwardly to a point adjacent to the bottom of the display tube 231 from the cover 233 is an air tube 235, this air tube 235 connecting with a passage 237 of the cover 233. Extending across the top of cover 55 and connected to the opening 237 is an air tube 238 which extends downwardly in back of the service chamber 60 and is connected, as illustrated in Fig. 12, to a boss 240 by means of a connector 241. The boss 240 has a passage 242 formed therethrough which connects to the opening 131 of the leg 130 of the valve member 110. The boss 240 is provided with a needle valve 244 by means of which a flow of air through the passage 242 is regulated. The needle valve 244 is adjusted so that a very small flow of air passes through the passage 242 and through the interconnecting parts to the display tube 231. The display tube 231 is filled with the oil which is dispensed by the dispensing apparatus. The air passing from the lower end of the tube 235 passes upwardly through the body of oil in the tube 231 in the form of air bubbles. This little device serves as a means for displaying the quality and character of the oil dispensed by the apparatus.

I claim as my invention:

1. A dispensing apparatus comprising: a service chamber; means for forcing a liquid into said service chamber; a vertical service tube extending into said service chamber, said service tube being vertically slidable so that it may be moved downwardly from zero position into different dispensing positions; a valve adapted to close said service tube when it is in zero position; means for placing a pressure on said liquid in said service chamber for dispensing said liquid through said service tube when said service tube is in any dispensing position; and yieldable means for preventing a flow of liquid through said service tube when it is in a servicing position except when said pressure is applied in said service chamber.

2. A dispensing apparatus comprising: a service chamber; means for forcing a liquid into said service chamber; a vertical service tube extending into said service chamber, said service tube being vertically slidable so that it may be moved downwardly from zero position into different dispensing positions; a valve mounted on the upper end of said service tube adapted to close said service tube when it is in zero position; means for placing a pressure on said liquid in said service chamber for dispensing said liquid through said service tube when said service tube is in any dispensing position; and yieldable means for preventing a flow of liquid through said service tube except when said pressure is applied in said service chamber.

3. A dispensing apparatus comprising: a service chamber; an inlet valve for closing a liquid passage to said service chamber, through which liquid is supplied to said service chamber; an operating member for opening said valve, in order to fill said service chamber; a vertical service tube extending into said service chamber, said service tube being vertically slidable so that it may be moved downwardly from zero position into different dispensing positions; locking means for locking said operating means when said service tube is not in zero position; means for placing a pressure on said liquid in said service chamber for dispensing said liquid through said service tube when said service tube is in any dispensing position; and means for preventing a flow of liquid through said service tube except when said pressure is applied in said service chamber.

4. A dispensing apparatus comprising: a service chamber; an inlet valve for closing a liquid passage to said service chamber, through which liquid is supplied to said service chamber; an operating member for opening said valve, in order to fill said service chamber; a vertical service tube extending into said service chamber, said service tube being vertically slidable so that it may be moved downwardly from zero position into different dispensing positions; locking means for locking said operating means when said service tube is not in zero position; a pressure valve adapted to close an air passage for placing a pressure on said liquid in said service chamber for dispensing said liquid through said service tube when said service tube is in any dispensing position, said pressure valve being opened by said operating member; and means for preventing a flow of liquid through said service tube except when said pressure is applied in said service chamber.

5. A dispensing apparatus comprising: a service chamber; means for forcing a liquid into said service chamber; a vertical service tube extending into said service chamber, said service tube being vertically slidable so that it may be moved downwardly from zero position into different dispensing positions; a valve adapted to close said service tube when it is in zero position; and counter means for separately counting the different quantities of liquid dispensed.

6. A dispensing apparatus comprising: a service chamber; means for forcing a liquid into said service chamber; a vertical service tube extending into said service chamber, said service tube being vertically slidable so that it may be moved downwardly from zero position into different dispensing positions; a valve adapted to close said service tube when it is in zero position; means for placing a pressure on said liquid in said service chamber for dispensing said liquid through said service tube when said service tube is in any dispensing position; means for preventing a flow of liquid through said service tube except when said pressure is applied in said service chamber; and counter means for separately counting the different quantities of liquid dispensed.

7. A dispensing apparatus comprising: a service chamber; an inlet valve for closing a liquid passage to said service chamber, through which liquid is supplied to said service chamber; an operating member for opening said valve in order to fill said service chamber; a vertical service tube extending into said service chamber, said service tube being vertically slidable so that it may be moved downwardly from zero position into different dispensing positions; locking means for locking said operating means when said service tube is not in zero position; and counter means for separately counting the different quantities of liquid dispensed.

8. A dispensing apparatus comprising: a service chamber; an inlet valve for closing a liquid passage to said service chamber, through which liquid is supplied to said service chamber; an operating member for opening said valve in order to fill said service chamber; a vertical service tube extending into said service chamber, said service tube being vertically slidable so that it may be moved downwardly from zero position into different dispensing positions; locking means for locking said operating means when said service tube is not in zero position; and counter means carried by said operating member for separately counting the different quantities of liquid dispensed.

9. A dispensing apparatus comprising: a service chamber; an inlet valve for closing a liquid passage to said service chamber, through which liquid is supplied to said service chamber; an operating member for operating said valve in order to fill said service chamber; a vertical service tube extending into said service chamber, said service tube being vertically slidable so that it may be moved downwardly from zero position into different dispensing positions; locking means for locking said service tube in zero position when said inlet valve is open; and counter means carried by said operating member for separately counting the different quantities of liquid dispensed.

10. In a liquid dispensing apparatus, the combination of: walls forming a service chamber; means for introducing a liquid into said chamber; a service tube extending upward a variable distance into said chamber, said tube having different positions for servicing zero and other quantities of liquid; a control member rotatable on an axis substantially parallel to the axis of said tube; a valve actuated by said member to render said liquid introducing means operative; and interlocking means provided upon said tube and said member which interlock so as to prevent movement of said member to actuate said valve excepting when said tube is in zero position.

11. In a liquid dispensing apparatus, the combination of: walls forming a service chamber; means for introducing a liquid into said chamber; a service tube extending upward a variable distance into said chamber, said tube having different positions for servicing zero and other quantities of liquid; a control member rotatable on an axis substantially parallel to the axis of said tube; a valve actuated by said member to render said liquid introducing means operative; and interlocking means provided upon said tube and said member which interlock so as to prevent movement of said member to actuate said valve excepting when said tube is in zero position, said interlocking means preventing said tube being moved from zero position while said member is moved to actuate said valve.

12. In a liquid dispensing apparatus, the combination of: walls forming a service chamber; means for introducing a liquid into said chamber; a service tube extending upward a variable distance into said chamber, said tube having different positions for servicing zero and other quantities of liquid; a control member rotatable on an axis substantially parallel to the axis of said tube; a valve actuated by said member to render said liquid introducing means operative; a service valve which is operable by said member to place the liquid in said chamber under pressure for servicing said liquid; and interlocking means provided upon said tube and said member which interlock so as to prevent movement of said member to actuate said valve excepting when said tube is in zero position, said interlocking means preventing said member being moved to operate said service valve when said tube is in zero position.

13. In a liquid dispensing apparatus, the combination of: walls forming a service chamber; means for introducing a liquid into said chamber; a service tube extending upward a variable distance into said chamber, said tube having different positions for servicing zero and other quantities of liquid; a control member rotatable on an axis substantially parallel to the axis of said tube; a valve actuated by said member to render said liquid introducing means operative; a service valve which is operable by said member to place the liquid in said chamber under pressure for servicing said liquid; and interlocking means provided upon said tube and said member which interlock so as to prevent movement of said member to actuate said valve excepting when said tube is in zero position, said interlocking means preventing said tube being moved from zero position while said member is moved to actuate said valve, said interlocking means preventing said member being moved to operate said service valve when said tube is in zero position.

14. In a liquid dispensing apparatus, the combination of: walls forming a service chamber; means for introducing a liquid into said chamber; a service tube extending upward a variable distance into said chamber, said tube having different positions for servicing zero and other quantities of liquid; a control member rotatable on an axis substantially parallel to the axis of said tube; a valve actuated by said member to render said liquid introducing means operative; a service valve which is operable by said member to place the liquid in said chamber under pressure for servicing said liquid; interlocking means provided upon said tube and said member which interlock so as to prevent movement of said member to actuate said valve excepting when said tube is in zero position, said interlocking means preventing said member being moved to operate said service valve when said tube is in zero position; and counters mounted on said member, the position of each counter corresponding to one of the servicing positions of said tube, said counter counting the number of servicing operations performed with said tube in said servicing position.

In testimony whereof, I have hereunto set my hand at Los Angeles, California, this 8th day of February, 1926.

HENRY R. NEWMAN.